United States Patent
Johnson et al.

(10) Patent No.: US 7,276,663 B1
(45) Date of Patent: Oct. 2, 2007

(54) PAINT SHIELDS FOR COVERS OF WALL MOUNTED CONTROLS

(76) Inventors: Ryan Loron Johnson, 27296 Buccaneer Dr., Bonita Springs, FL (US) 34135-4313; Daniel Louis Hachey, 27028 Belle Rio Dr., Bonita Springs, FL (US) 34135-4427

( * ) Notice: Subject to any disclaimer, the term of this patent is extended or adjusted under 35 U.S.C. 154(b) by 0 days.

(21) Appl. No.: 11/509,267

(22) Filed: Aug. 24, 2006

(51) Int. Cl.
*H05K 5/03* (2006.01)

(52) U.S. Cl. ............... 174/66; 174/67; 220/241; 220/242; 16/DIG. 2

(58) Field of Classification Search ............... 174/66, 174/67, 53, 58, 57, 54; 220/3.2, 3.8, 3.7, 220/241, 242; 33/DIG. 10, 528, 562; 16/DIG. 2; 118/505, 504, 506; D13/154, 156; D8/352, D8/353; 200/333
See application file for complete search history.

(56) References Cited

U.S. PATENT DOCUMENTS

| | | | | |
|---|---|---|---|---|
| D279,860 S | * | 7/1985 | Schwalbe | D8/353 |
| D297,396 S | * | 8/1988 | Schwalbe | D8/353 |
| 4,822,650 A | * | 4/1989 | Horiki et al. | 118/505 |
| 4,918,259 A | * | 4/1990 | Hanson | 174/66 |
| 4,968,856 A | * | 11/1990 | Bowley et al. | 174/67 |
| 5,063,872 A | * | 11/1991 | Maus et al. | 118/504 |
| D349,836 S | * | 8/1994 | Maggard | D8/353 |
| 5,375,728 A | * | 12/1994 | West | 220/3.8 |
| 5,526,952 A | * | 6/1996 | Green | 220/3.8 |
| 5,723,816 A | * | 3/1998 | Neece | 174/66 |
| 6,103,974 A | * | 8/2000 | Erdfarb | 174/66 |
| 6,653,566 B2 | * | 11/2003 | Petak et al. | 174/66 |
| 6,803,522 B2 | * | 10/2004 | Skakun | 174/66 |
| 6,927,341 B1 | * | 8/2005 | Crane | 174/66 |
| 7,022,915 B1 | * | 4/2006 | Galguera | 174/66 |

* cited by examiner

*Primary Examiner*—Angel R. Estrada
(74) *Attorney, Agent, or Firm*—Doonan Dwight McGraw

(57) ABSTRACT

A reusable shield for wall fixture control devices while painting the wall. It has an self-adjustable-depth feature that permits the shield to cover different types and sizes of fixture control devices that project from the wall, and can be sized to cover several such devices which have a common cover plate. The shield is shown to be made of two major parts, made either separately or flexibly joined, one of which is removably secured to the wall and the other of which is adjusted to accommodate the amount of fixture control device projection from the wall while preventing paint from entering the interior of the shield. The adjustable part is able to accommodate a side variety of control devices and is not shaped to be specific to any one device.

19 Claims, 4 Drawing Sheets

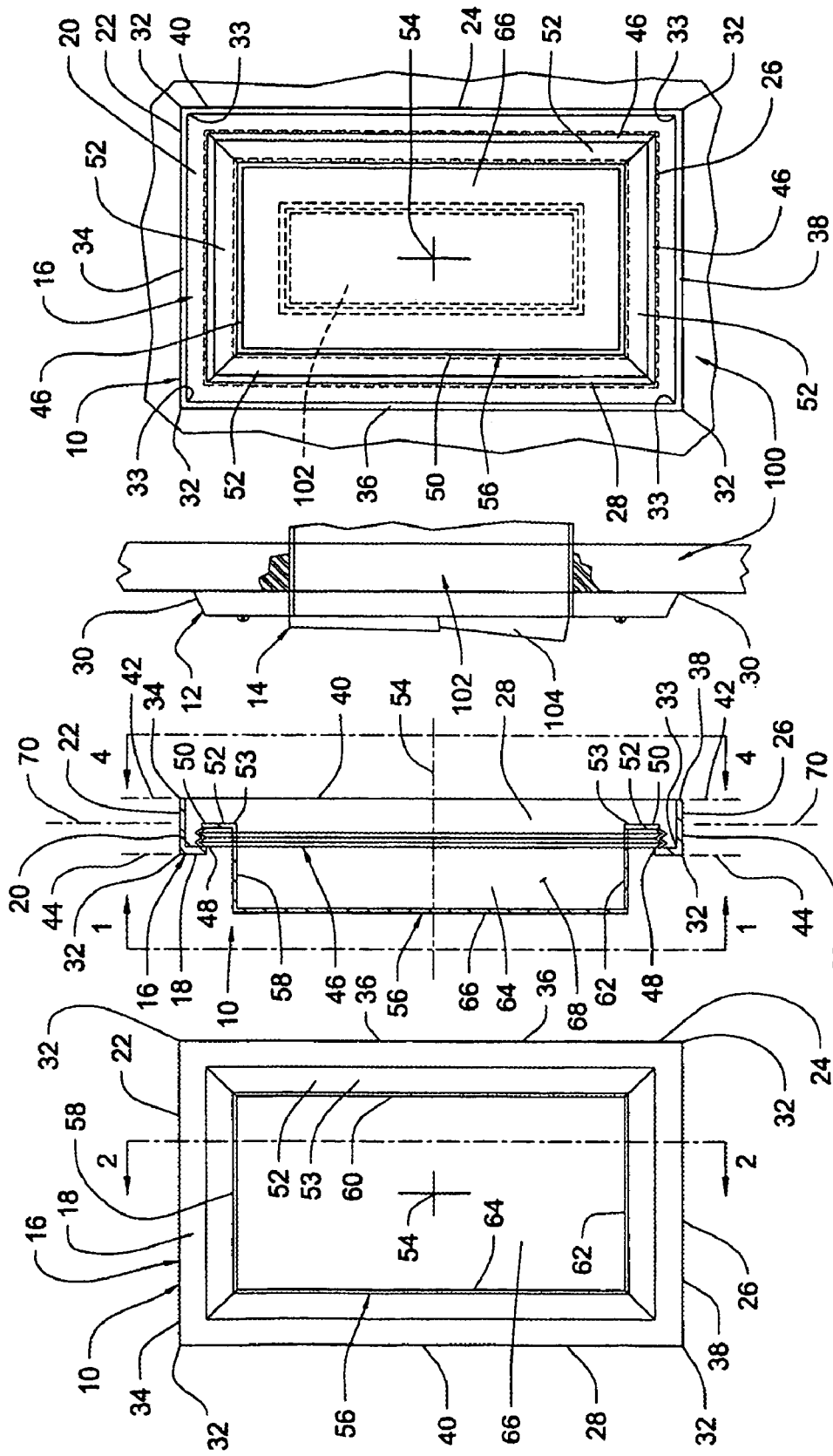

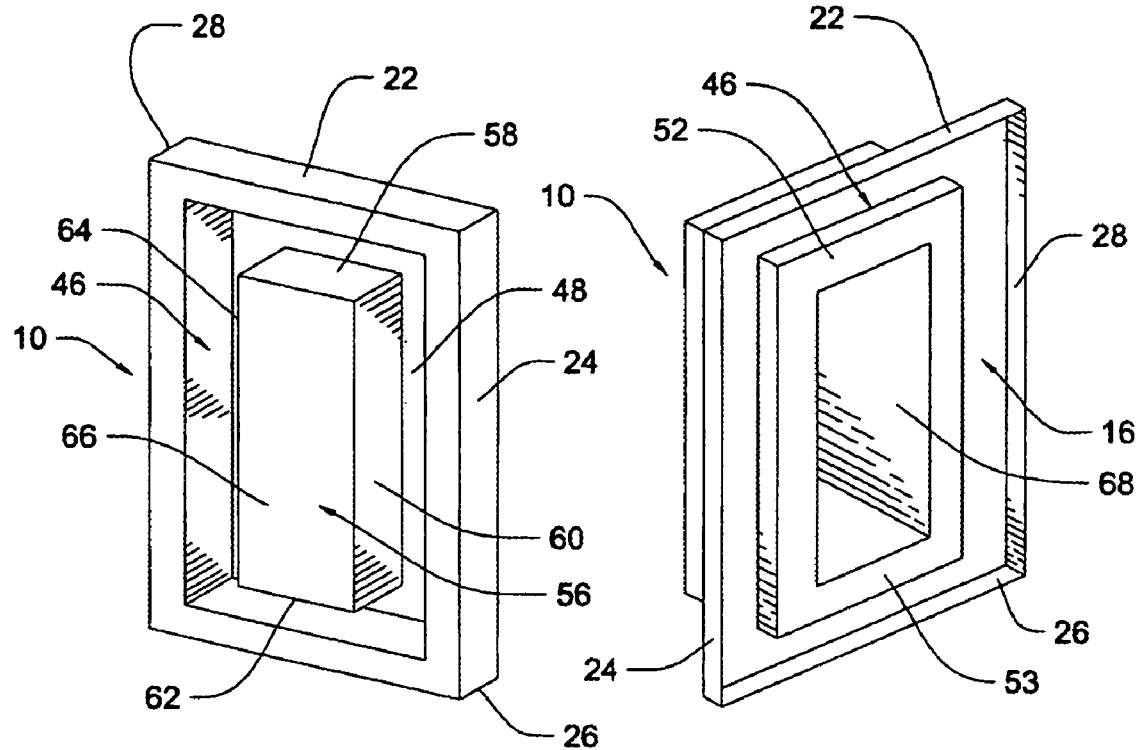
Fig 5
Fig 6
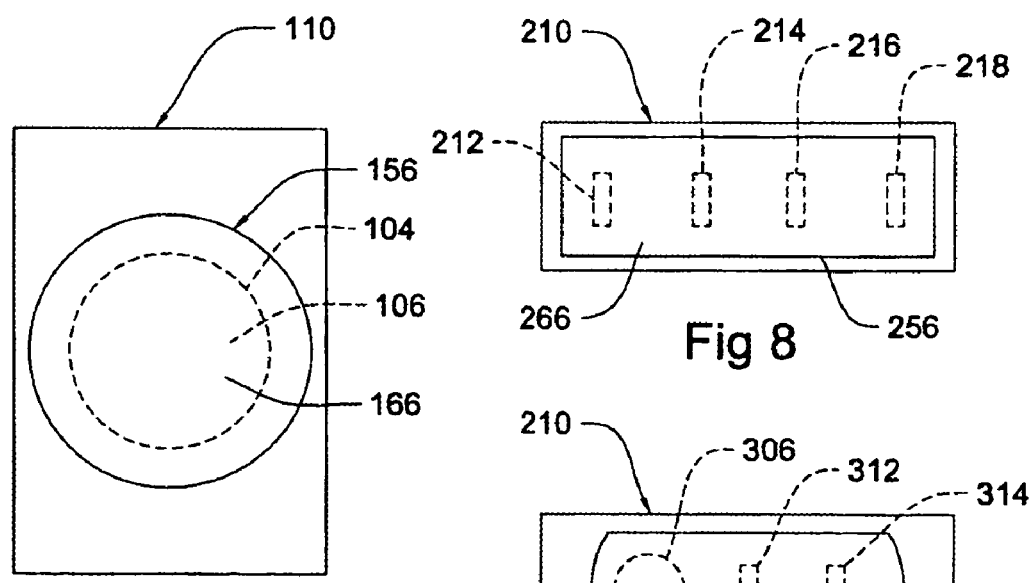
Fig 7
Fig 8
Fig 9

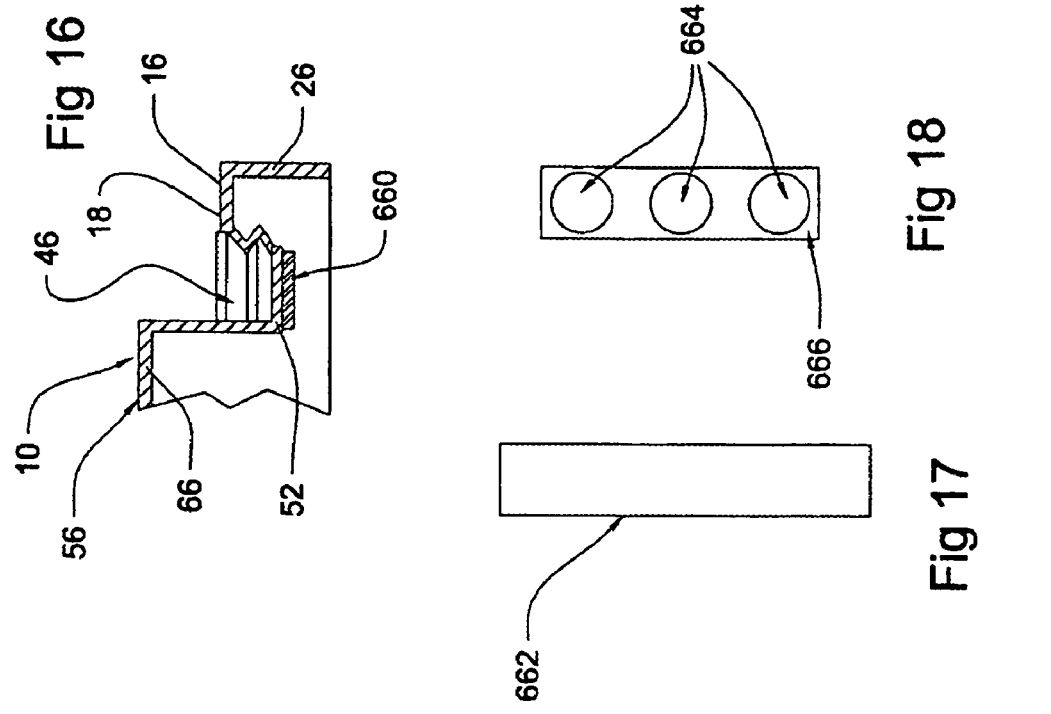

PAINT SHIELDS FOR COVERS OF WALL MOUNTED CONTROLS

The invention relates to paint shields used to protect the covers of wall mounted controls such as switches, rheostats, valves and the like, as well as the controls themselves. It particularly relates to such shields which protect covers and the controls directly associated therewith from paint while painting or washing the immediately adjacent wall surface.

BACKGROUND OF THE INVENTION

It is generally well known in the art to provide some type of paint shield to cover such controls as wall-mounted electrical and other outlets or switches. Examples of this include U.S. utility Pat. Nos. 5,375,728—West; 5,723,816—Neece; and U.S. Design Pat. Nos. 279,860—Schwalbe; 297,396-Schwalbe; and 349,836-Maggard; Also, U.S. Pat. No. 4,822,650-Horiki et al is of some interest, even though it is directed to a very different environment having different problems from that of the paint shields noted above. It is considered that it has some pertinency because it was cross-referenced from its primary Patent Classification Class 428 into Class 220 where paint shields are primarily found.

All of these references provide some type of covering for the face plate of the wall-mounted device being protected. When the covering is over electrical outlets, as in U.S. Pat. No. 5,375,728, for example, it is a flat rectangularly shaped plate with side flanges extending from its peripheral sides to form a slim cavity in which the cover plate being protected is received. The inner or rear side of the plate (the side defining a part of the slim cavity) has prongs which fit into the electrical receptacles of the outlet, holding the cover in place.

The covering shown in U.S. Pat. No. 5,723,816 has a similar cover plate which has an opening through which the switch handle or mesial is received, the opening having a rubber-like arcuate cover to protect the switch mesial, and is shaped for that specific purpose. It also has a pair of spaced spring clips which grip either side of the mesial to hold the paint shield in place.

The Design Patents noted above show different protrusions extending from the paint shield cover plate, the protrusions being shaped in accordance with the specific switch mesial or mesials of the switch assembly being protected. All of these protrusions are either fixed parts of the paint shield cover plate, or initially separate pieces which are fixedly mounted to the cover plate.

SUMMARY OF THE INVENTION

A paint shield cover plate assembly is provided which is universally usable for different types of wall-mounted controls, whether they be receptacle outlets, mesials of the typical on-off switches or large push-button types which either are pushed in and out or are of the rocker type, or push-button types which are substantially flush with the cover plate for the wall-mounted control being covered, or rotatable or pushed or rotatable-and-pushed knob-like types which may turn an electrical device being controlled off or on as well as adjust the electrical power being provided to control the speed of a fan or the brightness of electrical lamps, and slide types which have similar off-on plus power and power adjustments.

Other devices and supply fittings which are wall mounted and may be protected by paint shields embodying the invention when the wall is being painted include, by way of example but not of exclusivity, built-in vacuum system outlets for vacuum cleaning purposes, other air or vacuum pressure fittings, and oxygen outlets, as well as some other types found in medical and dental facilities, repair shops, office buildings, specialty shops and stores, etc. It is to be understood that hereinafter, when referring to wall-mounted controls that term also includes but is not limited to wall-mounted supply connections for supplying electricity, air under positive pressure, vacuum pressure air, and other fluids, gases or fluid-entrained powders as well.

These paint shield devices embodying the invention are provided to cover wall covering assemblies having a plurality of such controls, either alike or of different types. Yet the same basic paint shield, constructed with a width to cover either single controls or a plurality of controls and having a chamber into which the extended parts of such controls, may be used for protection from paint when the adjacent wall is being painted.

In its broadest aspect, the invention relates to a paint shield for protecting a wall-mounted control and its cover plate during painting of the wall on and in which the control or supply fittings are mounted, the paint shield comprising a plate having an inner side and an outer side and an opening extending therethrough and a recessed member having a connective structure between the recessed member and the plate by which the recessed member is movably and sealingly mounted on the plate. The plate, the recessed member and the connection are adapted to be releasably and operatively temporarily cover and be secured to the wall-mounted control and its cover plate before and while painting the wall on which the control is mounted so as to protect them from being painted, and further being adapted to be operatively released from and removed from the wall-mounted control and its cover plate, such release usually taking place after the painting of the wall has been completed, but can take place beforehand if it becomes desirable to remove the paint shield for any reason before the painting of the wall has occurred.

In a more particular aspect of the invention, the recessed member specifically extends through the plate opening and has a handle section extending outwardly beyond the outer side of the plate. The recessed member also includes a securing section extending inwardly beyond the inner side of the plate.

In another related aspect of the invention, the paint shield's recessed member has a chamber formed therein and an open end opening into the chamber. The chamber is adapted to receive, through the plate opening and through the chamber's open end a portion of the wall-mounted control which extends through its cover plate when that cover plate is covered by the paint shield in preparation for painting the wall.

In a further related aspect of the invention, the paint shield recessed member also has a flange extending outwardly around the chamber open end, the flange being in a plane which is substantially parallel to the plate. The flange has an inner side which is substantially parallel to the plate on the side of the flange which is facing away from the plate. The flange's outer side is the one which faces toward the plate. An adhesive is on the flange's inner side. The adhesive has adhesive characteristics wherein it is adapted to selectively secure the flange inner side to the wall-mounted cover plate, and can also be released from the wall-mounted control cover plate when that action is desired.

A typical adhesive that may be used may be similar to the adhesive that 3M® uses on its Post-It® Notes or its Sticky® Notes, or its Removable Scotch Tape® #811, or its Removable Double Coated Tape® #667, all of which are widely known for typical office use. If that particular type of adhesive is not sufficiently strong to maintain the security noted, then similar adhesives are also available with a higher level of adherency which will ensure the security required to hold the paint shield in place, yet allow it to release when desired.

An important aspect of the invention is the available movement of the recessed member toward and away from the wall-mounted device cover plate during placement, securement to and release of the paint shield from that cover plate while maintaining a seal between the recessed member open end and the plate relative to which it is movable. This available movement in one direction permits the paint shield to be placed over and temporarily secured in place to the cover plate of the wall-mounted control device, and the available movement in the opposite direction also causes operative detachment of the paint shield from the cover plate of the wall-mounted control device. And during the available movements in those opposite directions the chamber containing a protruding part of the control device is sealed so as to prevent paint, whether in large parts or a spray form, from engaging the device or devices being protected from the paint.

The invention also particularly relates to a paint shield for protecting a wall-mounted cover and at least one wall-mounted control normally covered by the cover, the wall-mounted control having a manual control portion extending through and projecting outwardly of the wall-mounted cover. Structures embodying the invention may also be used to protect electrical receptacles, connections for air, as well as for oxygen and other gases depending upon the type of installation and what connections are needed, and their cover plates, even though they do not have manual control portions projecting outwardly of their covers. For the purposes of this document, all such controls, receptacles and connections and their known equivalents are therefore included in the term wall-mounted control.

More particularly the invention also relates to a paint shield as follows: The paint shield has a first section forming a cover plate configured to peripherally extend over and cover a peripheral part of the wall-mounted cover. The first section has an opening therein defined by an inner peripheral surface on the first section, that opening having a center axis which extends substantially a right angle to the first section. It also has a second section mounted on the first section by an intermediate connection between and connecting the two sections. The second section extends axially through the first section opening. That second section forms a closed container defining a space adapted to receive the manual control (s) of the at least one wall-mounted control extending through the first section opening in coaxial relation to said axis of the first section opening. This second section has first and second axially spaced ends, with the first end being closed and the second end being open so as to constitute an open end of the second section. A lip or flange is formed on the second section open end. The lip or flange extends peripherally outward to provide an outward peripheral side or surface. This lip or flange side or surface extends between the one open end and the outward peripheral surface of that lip or flange. Thus a flange side extending axially away from the second section is said in a plane which is substantially perpendicular to the first section opening axis, the flange side having an adhesive thereon which is operable to hold the flange into engagement with the wall-mounted cover when the second section is moved axially further through the first section opening to so operatively engage the flange with the wall-mounted cover.

The intermediate connection noted above has a spring arrangement biasing the second section in opposite axial directions and acting on the first and second sections to have an at-rest relative axial position wherein the spring arrangement spring forces tend to hold the second section in a axially central axial position relative to the first section. There are several spring arrangements disclosed herein, and they are provided by way of example rather than limitation as to the particular type of spring arrangement to be used.

The spring arrangement is able to axially expand and contract to permit the second section to be moved relative to the first section against the spring force of the spring arrangement acting on the second section and tending to return the second section to its central axial position, the spring arrangement being adapted to allow the second section adhesively-coated flange to adhesively engage the wall-mounted cover plate upon sufficient axial movement of the second section flange toward the wall-mounted cover plate and that adhesive engagement holds the second section in that axial position until being deliberately pulled away from the wall-mounted cover plate for removal of said paint shield from covering engagement with said wall-mounted cover plate.

A more detailed feature of the invention is provided as a part of the paint shield earlier described wherein the intermediate connection's the spring arrangement is provided as an accordion-like multifold member having an at-rest length condition wherein the spring arrangement is at a spring-force-balanced condition. The multi-fold member acts as a compression spring when compressed and a tension spring when tensioned. The multi-fold member extends axially about the first section opening center axis and has a first end and a second end. The first end extends from the first section inner peripheral surface and the second end extends from the second section lip outer peripheral surface so that the intermediate connection is sealingly connected and spring-connected to the first and second sections for spring force exertion thereon.

It is within the purview of the invention for the intermediate connection to be formed in other manners, as alternatives. For example the seal portion may be formed as a labyrinth seal in which the spring means is received, and that includes any of several types of spring.

Also within the purview of the invention the spring means may be or include springs of the wavy leaf spring type, or coiled springs, by way of example but not of limitation. By the same token, the device or arrangement for having a shield portion attaching to and later released from the cover plate of the wall mounted control may employ one or more magnets or series of magnets instead of an adhesive.

One example of such magnets is strip magnet segments of the type having been used to seal and hold closed refrigerator doors for at least the past thirty and more years. These are made in strips and may be broken or cut to the desired length to fit in the spaces provided. The actual total linear length of such magnets used is controlled to a major extent by the desired amount of magnetic attraction forces between such magnetic strips and the cover plate or the metallic, magnetically reactive screws of other fastening devices holding the cover plate to the wall-mounted control.

An alternative magnet arrangement that is also inexpensive is the use of a series of small, flat, and usually circular, magnets such as those also used in various crafts and are readily available in craft stores. When using such magnets, the number of them used in any one paint shield will depend upon the attained magnetic holding force desired to move or at least assist in moving the movable portion of the shield assembly so that the magnet or magnets contact and magnetically hold the paint shield in place, and the magnetic attaching force that can be easily overcome when it is desired to remove the paint shield. This is accomplished by gripping the recessed member on which the magnets are mounted and exerting the necessary pulling force to break the magnetic adhesion and pulling the recessed member and its magnets away, detaching the magnets from the cover plate by overcoming that magnetic holding force, and thus removing the paint shield from the wall and the wall-mounted control to which it was temporarily attached.

The assemblies embodying the invention have a projecting shield cover section so shaped that it may cover the more commonly shaped ones of various of wall-mounted controls and receptacles which may or may not have projections extending therefrom for each manual activation, including the cover plates for those controls, connectors or receptacles. Thus it has substantial universality. Also, it is formed so that the inner part of the recessed member or handle that covers any receptacles, connectors or switch parts includes the intermediate connection and is made in accordion-like fashion, and is able to extend or contract when it is installed so as to have the paint shield only extend outwardly from the wall surface an amount necessary to protect those parts it is protecting.

In taking full advantage of this feature, the peripheral portion of this section facing toward the wall-mounted control being protected is provided, in many instances, with an adhesive or an array of magnets which is pressed or moved into engagement with the outer surface of the cover of the control assembly being protected when the paint shield is being installed over that cover. That adhesive, or the array of magnets, is sufficiently strong to hold the paint shield in place while the adjacent wall is being painted. Also, the adhesive provides a full seal so that, with the switch or receptacle or other control part of the assembly is received within the projecting shield cover section, the switch or other control part is sealed against any paint droplets if the paint is sprayed on, and against any other foreign matter from getting into the control assembly by way of the switch or other control part. Likewise, if the array of magnets is used, it substantially seals to a similar effect.

Furthermore, the paint shield portion covering the switch or other control, sometimes referred to at the recessed member, acts as a handle to hold the paint shield while installing it, and by simply pushing it inward after the outer part of the paint shield is fitted over the cover for the control being protected, the sealing and adhesive action of the adhesive or magnet array on the bottom part of the shield's cover section is sealingly and adhesively or magnetically connected to the cover plate covering the part being protected, and the paint shield is installed and ready to protect the switch or other control assembly from paint during the wall painting operation.

SHORT DESCRIPTION OF THE DRAWINGS

FIG. 1 is a plan view of the paint shield shown in FIGS. 2, 4, 5 and 6, looking at the inner parts of the paint shield, typically as they are seen in perspective in FIG. 6 and also looking in the direction of arrows 1-1 of FIG. 2.

FIG. 2 is a cross section view of the paint shield of FIG. 1, taken in the direction of arrows 1-1 of that FIGURE and showing the relatively movable portions of the shield in the relative position they will have before the paint shield has been installed over a switch assembly cover and the switch assembly control, or mesial.

FIG. 3 is a side elevation view of a wall-mounted control, in this instance an electrical switch, and its cover which are typically used as a wall-mounted control unit for controlling an electrically powered device such as a lamp or a motor, being installed on and within a wall. A typical rocker-type switch mesial is shown. The wall is shown broken away in cross section.

FIG. 4 is an elevation view taken in the direction of arrows 4-4 of FIG. 2 of the paint shield embodying the invention for covering the wall-mounted control and its cover shown in FIG. 3.

FIG. 5 is a perspective view of the paint shield of FIGS. 1, 2 and 4, looking at the front or external portion of the shield.

FIG. 6 is a perspective view similar to that shown in FIG. 5 looking at the rear or internal portion of the paint shield of FIG. 5.

FIG. 7 is a plan view of a paint shield similar to the paint shields of FIGS. 1, 2, 4, 5 and 6, showing that it can be particularly adapted to be used over a circularly-presented control, with the handle of the shield being circular and of appropriate interior construction to protect a typical rotatable switch from paint at the time that the wall surface adjacent the control assembly is being protected. While not shown, the plate portions of this and the other illustrated paint shields may have plan configurations other than rectangles, such as ovals, squares, circular or a mixture thereof. Certain other such configurations may be desired due to the non-rectangular shape of the wall-mounted cover plate, of which many different shapes are known, usually for their decorator effects.

FIG. 8 is a plan view showing that paint shields embodying the invention it can be used over a switch gang assembly made up of a plurality of switch assemblies, each having a mesial, shown in phantom under the surface of the portion of the paint shield covering the mesial and protecting those switch controls. Such shields may, of course, also be used with other types of wall-mounted controls.

FIG. 9 is similar to FIG. 8 and shows that paint shields embodying the invention can cover different types of control devices which have a single cover covering their individual controls, such as a switch and a rheostat or a push-pull device or any generally similar types of such control devices or mesials. It also shows that the cover portion extending over the controls and adhesively attached to the cover plate for these plurality of control devices may have other plan view shapes such as circles, ovals and/or quadrilateral figures such as rectangles or squares. Since this is by way of example, other such plan view shapes of wall-mounted controls and their cover plates may also be shielded from paint intrusion during the wall painting process by use of paint shields embodying the invention.

Figure 10:
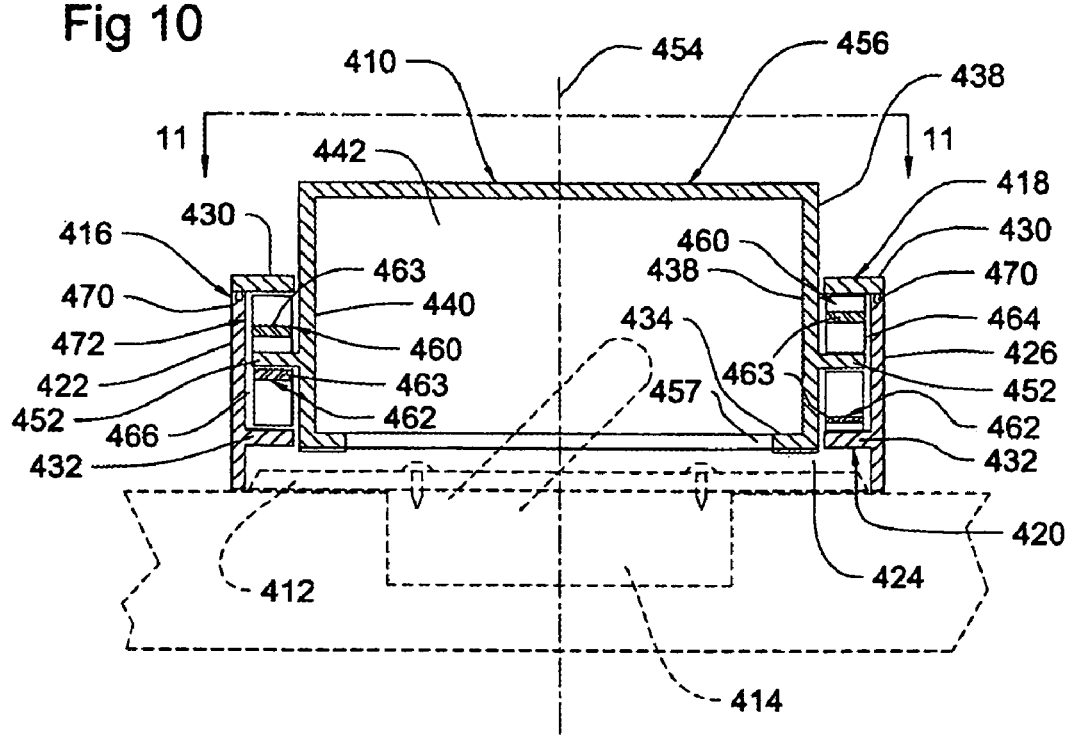

FIGS. 10 through 13 show a modification of the paint shield invention herein disclosed and claimed in which various types of conventional springs and spring seats are used to provide the intermediate connection and spring means of the invention. More specifically, FIG. 10 is a cross section view, similar to that of FIG. 2 and FIG. 3 if they were combined, of the modified structure taken in the direction of arrows 10-10 of FIG. 11. It also shows a labyrinth sealing arrangement instead of the multi-fold sealing and spring arrangement of FIGS. 1, 2, 4, 5 and 6.

Figure 11:
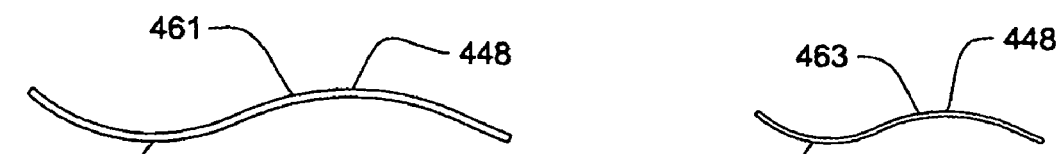

FIG. 11 is a plan view of the paint shield of FIG. 10, looking at the top of the paint shield in the direction of arrows 11-11 of that FIGURE, and is similar to the paint shield shown in FIG. 1.

Figures 12, 13:
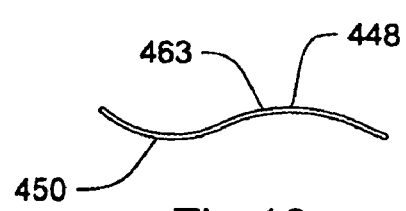

FIG. 12 is a side view of one of the wave springs used in the structure of FIGS. 10 and 11, taken in the direction of arrows 12-12 of FIG. 11. It shows only the wave spring which is used on the longer side of the structure, and none of the rest of the structure.

FIG. 13 is a side view of another one of the wave springs used in the structure of FIGS. 10 and 11, taken in the direction of arrows 13-13 of FIG. 11. It shows only the wave spring which is used on the shorter side of the structure, and none of the rest of the structure.

FIGS. 14 though 18 relate to the use of magnetic adhesive forces for temporarily securing the paint shield to the cover plate, or, if the cover plate is plastic and therefore nonmagnetic, to the cover plate screws that hold the cover plate to the wall-mounted control, so long as those screws, with the magnets in engagement with them, are properly so positioned and are capable of being magnetically attracted to the magnets in magnetic force holding relation.

More particularly, the paint shield shown in FIG. 14 is similar to the paint shields shown in FIGS. 1, 2, 4, 5, 6, 10 and 11, but using strip magnets instead of the adhesive of those FIGURES. It also shows coil springs being used instead of the multi-fold accordion-like spring means of FIGS. 1, 2, 4, 5 and 6, and the labyrinth type of sealing arrangement.

FIG. 15 is an elevation view of the rear part of the paint shield of FIG. 14, taken in the direction of arrows 15-15 of that FIGURE.

FIG. 16 is a partial section view of the type of intermediate connection shown in FIGS. 1, 2, 4, 5 and 6, using magnets instead of the sticky type adhesive. The magnets shown are physically in and an integral part of strip sections, one of which is shown in FIG. 17, and may be attached to the appropriate part of the recessed member by being glued in place.

FIG. 18 illustrates magnets of a disc type with the two faces respectively being north and south magnetic poles. Such disc type magnets may be directly and individually attached, as are the strip magnets of FIGS. 16 and 17, or may be embedded in a matrix formed of a suitable non-magnetic plastic material so that they are also in strip type configuration for ease of handling and simplified attachment to the desired part of the recessed member of the paint shield.

DETAILED DESCRIPTION OF STRUCTURES EMBODYING THE INVENTION

The paint shield 10 embodying the invention as shown in FIGS. 1, 2, 4, 5 and 6 has a rectangular shape to cover a wall mounted cover plate 12 for the wall-mounted control 14, seen in FIG. 3, that is similarly shaped. Since the rectangular shape is the most common shape of cover plate 12, that shape is the one illustrated because it would have the greatest universal usage. Shield 10 includes a plate 16 having a front wall 18, a back wall 20, and side walls or flanges 22, 24, 26 and 28 extending from the back wall 20 and adapted to fit over the outer periphery 30 of cover plate 12. Plate 16 is illustrated as being in the shape of a hollow rectangle as is best seen in FIGS. 1, 2 and 4 and thus has an outer peripherally continuous corner 32 and an inner peripherally continuous peripheral corner 33 as identified in FIG. 2. The side walls or flanges 22, 24, 26 and 28 actually extend from and form a part of the outer peripherally continuous corner 32 and their outer edges 34, 36, 38 and 40 lie in a plane 42 which is substantially parallel to a plane 44 in which the plate 16 lies.

It is to be clearly understood that when a cover plate equivalent to cover plate 12 has a different shape, then the paint shield 10 will also have that different shape in a plan view of the type shown in FIGS. 1 and 4. Such other shapes which are often provided for decorative rather than functional purposes may be ovals, hour-glass, circular, or other geometric shapes which can be employed as a cover plate equivalent to cover plate 12. Of course the usual rectangular shape will be differently proportioned depending upon the number and arrangement of the various wall-mounted controls 14 which are covered by a single cover plate 12. This is clearly shown in FIGS. 7, 8 and 9 which will be later more fully described.

As is most clearly seen in the cross section view in FIG. 2, a flexible multi-fold accordion-like section or member 46 has one end 48 thereof at the back wall 20 of plate 16, with the multi-fold section 46 and the plate 16, as well as other parts to be described, being made so that the paint shield is one device having different parts formed as a unitary structure to constitute the entire device. The other end 50 of the multi-fold section 46 has thereon a flat plate section 52 which is similar to the plate 16, but is smaller as seen in the plan views and perspective views of FIGS. 1, 2, 4, 5 and 6. Of course, it is to be understood that section 46 may be made separately and have its one end 48 attached to the back wall 20 of plate 16, and its other end 50, including the flat plate section 52, attached to the open end of the recessed member 56 to be later described. Alternatively, the flat plate section 52 may be an integral part of the recessed member 56 at its open end, with the other end 50 of section 46 being attached to such flat plate section 52 instead.

The surface 53 of flat plate section 52 extending toward plane 42 is coated with an adhesive so that, when it is moved into engagement with the wall-mounted cover plate 12, it will adhere to that plate and hold the entire paint shield in position wherein it protects the wall-mounted control from paint during the wall painting process. The adherence of the adhesive to the cover plate 12 is broken when the paint shield 10 is removed. It is removed by grasping the exterior of the recessed member 46 and pulling it, and therefore the entire paint shield 10, away from the cover plate 12. As earlier noted, magnetic material or materials may be used for the same purpose, and are shown in FIGS. 14 through 18, to be later described in detail.

As also can be clearly seen in FIG. 2, the multi-fold section 46 is therefore within the inward space defined by the plane 44 of the plate 16, the side walls or flanges 22, 24, 26 and 28 and the plane 42. The multi-fold section 46 is considered to have a central axis 54, whether its overall appearance in perspective is rectangular or of other shape. Section 46 is preferably similar to the bellows of an accordion or concertina in that, in cross section as seen in FIG. 2, it is a zigzag with a desired number of "zigs" and "zags" to have a desired at-rest axial length which is axially approximately midway between the planes 42 and 44. Also, it must have an extended length which at least closely approaches plane 42. The desired at-rest axial length is at or near the condition shown in FIG. 2.

It is within the scope of the invention to provide other similar multi-fold section constructions, such as that found in some flexible plastic pipes commonly used to vent clothes dryers. These are similarly formed, but the folds are really spirals having the similar appearance of a screw thread. Another example of the multi-fold section construction is found in a part of a drinking straw that makes it easy to bend the straw without collapsing it, allowing a person to drink through the straw more easily when lying in bed. These examples are not given by way of limitation, but are provided for a clearer understanding of the requirements of any form of multi-fold section, including some that are flexible and of a unitary plastic construction. In some instances, particularly because of the multi-fold section's configuration, it may be found desirable to make the paint shield embodying the invention in two or more parts and then assemble the parts by securing them together. This may be less expensive by using simpler molds for the plurality of parts than making and using a single mold for the entire paint shield assembly. Also, FIGS. 10 through 13, described in detail below, relate to a modified version of paint shield embodying the invention which requires some assembly.

The paint shield 10 includes a recessed part 56 which serves to at least contain the outwardly extending parts of the mesial 104 or other controlling part when the shield is in place. Recessed part 56 also serves as a handle for positioning the paint shield over the cover plate 12 before painting the adjacent wall surface. Recessed part 56 extends outwardly from the flat plate section 52 of the flexible fold section 46, passing through the plane 44. In the rectangular configurations of FIGS. 1, 3, 4, 5, 6, 8 and 9, it therefore has four sides 58, 60, 62 and 64 and a top 66, effectively forming a box, the space 68 formed thereby being open toward plane 42 and extending to the plane 70 in which the flat plate section 52 is contained. Recessed part 56, the shield plate 16, flanges 22, 24, 26 and 28, and the flat plate section 52 are preferably reasonably stiff, while the multi-fold section 46, particularly at it the lines of its folds, is sufficiently flexible to permit the folds of the multi-fold section 46 to be folded very close or into contact with each other and to be opened to permit those folds to move pivotally and axially. These pivotal and axial open fold movements allow the multi-fold section 46 to be elongated axially while maintaining paint-protective sealed closure so that no paint will penetrate through the folds while paint is being applied to the adjacent wall. Also, the relative stiffness of the recessed part 56 not only protects the mesial 104 or other control part, but also may be gripped and act as a handle of the paint shield 10 for ease of application and removal of the paint shield 10 relative to the cover plate 12.

FIG. 3 is a cross-section view of a typical building wall 100 having a wall-mounted control 102 mounted in and on that wall and extending through the wall, in the well-known manner. Control 102 also has at least one part 104 extending outwardly of the wall and through the opening or openings provided for it in the wall-mounted cover plate 12. In FIG. 3, such a part 104 is somewhat schematically illustrated as a rocker for controlling the control 102. This is typical of a simple on-off switch for turning a light on and off, for example.

FIG. 4 shows the paint shield 10 of FIGS. 1 and 2 installed over the wall-mounted control 102 and its cover plate 12 so as to protect the control 102 and its cover plate 12 while the adjacent portions of the wall 100 are being painted. The control 102 is shown in phantom because it cannot be seen, being covered by the end 66 of the recessed member or part 56 of the paint shield 10. FIGS. 5 and 6 are provided to give perspective views for a better understanding of the construction of the paint shield 10 as it is when ready to be installed over a wall-mounted control and that control's cover plate.

In FIG. 7, the at least one part 104 is a knob 106, shown in phantom because in that FIGURE it is hidden under the end wall 166 of the recessed part 156. The recessed part 156 is functionally similar to the recessed part 56 described in detail above in that it is moved relative to the plate 16 axially along axis 54 while maintaining a seal between it and the plate 16, and the surface 53 of its flange or flat plate section 52 is operatively attached to the cover plate 12. Knob 106 typically is capable of being moved rotatably and possibly axially as well to control the control 102. Also, if desired, the recessed part 156 may be shaped to conform to that knob as shown, or may still be at least generally rectangular in shape so as to be more universally usable.

In FIG. 8, the paint shield 210 is still rectangular, but is shown as being wider so that it can cover a multi-switch cover plate. By way of example there are four mesials 212, 214, 216 and 218, shown in phantom because they are actually hidden by the end wall 266 of the recessed part 256 of paint shield 210. These mesials are part of four wall-mounted controls of well-known configuration, not further shown, all extending through one wall-mounted cover plate, which in this FIGURE is covered by the shield 210. Of course, there may be anywhere from one to any reasonable desired plurality of various controls such as mesials or other well-known devices for controlling or connecting with wall-mounted controls. Two to six controls under one cover plate are not at all unusual, and more than that may be under one cover plate and need protection from the paint when the wall nearby is to be painted.

In FIG. 9, there is another sample arrangement of a paint shield 310 embodying the invention wherein the recessed part 356 of the shield 310 is somewhat oval instead of absolutely rectangular, yet it also covers all of the portions of wall-mounted controls which extend through the cover plate the cover plate for them. Such portions extending though that cover plate are illustrated in phantom as being a knob 306 and two mesials 312 and 314. This only emphasizes that paint shields may embody the invention when they can be used with many various types of wall-mounted controls and their cover plates.

The various arrangements of FIGS. 7, 8 and 9 are provided only to show the versatility of various paint shields 110, 210 and 310 embodying the invention, and are not intended to be all-inclusive, but only examples. There are other known controls which extend through their respective wall-mounted cover plates, such as slides, arcuately left-to-right pivoted levers; however, the particular type or types of such extended controls to be protected from paint is not a limitation on the invention herein disclosed and claimed.

FIGS. 10 and 11 are similar to FIGS. 1, 2 and 3, except that they employ a labyrinth type of seal arrangement and a different type of spring means as parts of the intermediate connection between the first and second sections of a paint shield 410 embodying the invention. Essentially, the springs, which are the spring means part of the intermediate connection, can be forced to contract and expand so as to act on the first and second sections of the much like the multi-fold member does as it exerts spring forces on those sections. However, the springs in FIGS. 10 and 11 do not exert any tension forces as they are expanded, and therefore there are two sets 460 and 462 of springs, one set 460 urging the recessed part 456 and its flange 452 in the direction toward a cover plate 412 to be protected and the other set 462 urging the recessed part 456 and its flange 452 in the direction away from a cover plate 412 to be protected. In this arrangement, the springs are usually maintained under some compression force, so that they do not have to act at times in compression and at other times in tension as does the multi-fold member shown in earlier described FIGS. 1, 2 and 4 as well as the multi-fold member type of spring construction in later-described FIG. 16.

In FIGS. 10 and 11, the paint shield 410 embodying the invention also is shown as having a rectangular shape to cover the wall-mounted cover plate 412 for the wall-mounted control 414 which is mounted in and on a wall 400. Shield 410 includes a plate assembly 416 having a front wall 418, a back wall 420, and side walls 422, 424, 426 and 428. The front and back walls 418 and 420 are respectively formed as inwardly extending flanges 430 and 432. Each of those flanges have a hollow rectangular configuration similar to a rectangularly shaped doughnut and each one is located about the axis 454 of the recessed member 456. These flanges function as parts of a labyrinth seal arrangement between the recessed member 456 and the side walls 422, 424, 426 and 428 so as to satisfactorily maintain the sealing against paint entering inside the recessed member 456 and the plate assembly 416 during the wall painting operation.

The recessed member 456 has a flange 434 extending inwardly at the open end 457 of recessed member 456. Flange 434 also has a hollow rectangular configuration similar to a rectangularly shaped doughnut and is also located about the axis 454 of the recessed member 456. Another flange 452, noted earlier above, is formed on and extends laterally outward from the outer side 438 of the recessed member. It also has a hollow rectangular configuration similar to a rectangularly shaped doughnut, and is located at an intermediate part of the recessed member 456 side walls 438, 440, 442 and 444 so that it is positioned in axially spaced relation with reference to the direction of the axis 454 and is substantially perpendicular to that axis, as are the flanges 430 and 432. The flange 430 is made as a separate element of hollow rectangular shape similar to a rectangularly shaped doughnut, but is snapped, cemented or otherwise fastened in place on the outer ends 470 of the side walls 422, 424, 426 and 428 after the spring sets 460 and 462 are placed in the axially extending spring-receiving spaces 464 and 466, respectively, which are respectively formed by the flanges 430, 432 and 452 and the recessed member side walls 438, 440, 442, 444 and the side walls 422, 424, 426, 428 of plate member 416. Spaces 464 and 466 therefore are also rectangularly shaped like a rectangularly shaped doughnut.

The spring set 460 is shown as being respectively made of four springs, two in the longer sections of space 470 being spring 461 illustrated in FIG. 12 and two in the shorter sections of space 470 being springs 463 illustrated in FIG. 13. Spring set 462 is also shown as being respectively made of four springs, two in the longer sections of space 466 being springs 461 and two in the shorter sections of space 466 being springs 463. For assembly, the spring set 462 is loaded into space 466 on flange 432, then the recessed member is loaded so that its flange 452 engages the springs of spring set 462, after which spring set 460 is then loaded into space 464. The recessed member 456 is then inserted into the space formed by the side walls 438, 440, 442 and 444 of the plate assembly 416 so that flange 430 is placed over the space 464 on top of the spring set 460, compressing that spring set and also concurrently compressing spring set 462. The flange 430 is then snapped in place using a tongue and groove arrangement similar to that used on plastic bags known as Glad® Zipper Bags or Ziploc® brand bags, such bags being marketed to hold and seal therein foods such as sandwiches. It may also or alternatively be cemented in place, with or without the tongue and groove arrangement.

Thus the spring sets 460 and 462 are partially compressed when they are in place in their respective spaces, and exert substantially equal and opposite spring forces on the flange 436 so that the recessed member 456, its flange 452, and the plate assembly 412 are located in a relatively neutral axial relation position shown in FIG. 10, and the recessed member 456 may be moved in one direction from that neutral position to further compress the spring set 462 while tending to unload the spring set 460. This is the axial direction of movement of the recessed member by the person installing the shield when it is being temporarily installed over a wall-mounted cover plate.

The recessed member 456 may be moved in the opposite axial direction by pulling on it in a direction away from the wall 400, breaking the adhesive or magnetic connection holding the recessed member in temporarily attached relation to the wall-mounted cover plate 412, and may be moved only back to the neutral position and released, or may be moved axially beyond that neutral position if pulled sufficiently for such movement relative to the plate assembly. If it is moved in the opposite direction from that neutral position it will further compress the spring set 460 and tending to unload the spring set 462. When released, however, the two spring sets return the recessed member 456 and its flange 452 to the neutral position earlier described and as shown in FIG. 10.

It is to be understood that other intermediate connections may be provided which have different spring types. Such springs may be coil springs of several well-known types, leaf springs or belleville springs, by way of example but not limitation, and may be employed in a similar manner to the wave springs 461 and 463 of FIGS. 10, 11 12 and 13. Likewise, the connecting means may have different types of seal constructions other than the multi-fold accordion-like arrangement. The arrangements shown in FIGS. 10 and 11, and FIGS. 14 and 15, for example, use a series of very restrictive areas at the ends of flanges which are immediately adjacent to walls so as to provide a labyrinth type of sealing arrangement 472. In some instances, there may even be wipers or seals on the flange outer ends, which would typically be small O-rings or be somewhat like the windshield wipers used on automobiles, but simpler, to further seal between the chambers on the opposite sides of the interior flange 452. In the particular usage of the paint shield, such wipers are considered unnecessary. While in appearance the multi-fold member type of seal may seem more simple, it may be sufficiently more difficult or expensive to make it than to make and assemble the labyrinth type of seal. Either seal construction will perform sufficiently well for the purpose of keeping paint away from the cover plate 412 and the wall-mounted control 414 while the adjacent wall portions are being painted.

FIGS. 10-13 and 14, 15 show two specifically different spring arrangements which will perform the same spring compressive force functions, but not the tension functions, as shown in FIGS. 1, 2 and 4. The springs 461 and 463 of FIGS. 10-13 are each a series of one or more wave springs which may be made of metal or plastic. They may have more upper and lower nodes than the upper node 448 and the lower node 450 shown in FIGS. 12 and 13. More nodes could increase the spring stability, and may well be preferable in some installations. For example, having two upper nodes linearly separated one lower node would tend to keep each spring in place and have its spring forces apply more evenly to the flanges with which it is engaged. With the very light weight parts of the paint shield embodying the invention, because they would usually be made of plastic molded material, the force applications would not be a problem when only one node engages any one flange, and that keeps the springs more simple to make.

The paint shield 510 has sets of springs 540 and 542 shown in FIGS. 14 and 15 are light metal or plastic springs made of spring wire or a suitable plastic material. They are coil springs and their overall appearance may be round, square, hexagonal or other polygonal shape. As in FIGS. 10 and 11, a rectangular paint shield will have four sections of space 466 between the flanges 432 and 452, and another four sections of space 464 between the flanges 452 and 430. Therefore, the spring sets 540 and 542 will include four sections of springs 560, assuming that all four sections of spaces 464 and 466 are to be occupied by springs as shown in FIG. 15. The longer space sections are spaces 552 and 554, and the shorter space sections are 556 and 558.

It is within the purview of the invention that at times, only two of the four space sections of each spring-containable space 464 and 466 would have springs in them. Those may be either space sections 552 and 554 containing two longer matrices 562 containing some springs 560 or space sections 556 and 558 containing shorter matrices 564 containing some springs 560 as seen in FIG. 15 when the paint shield 510 is rectangular as shown. The set of springs for each one of the sections of these spaces in which they are located are preferably mounted in a spring spacer or matrix 562 or 564 located on the longitudinally middle part of each of the springs, which makes assembly easier that it would if the springs were loose, and assures that the springs remain in their proper positions and orientation after they are place and the assembly of the paint shield of which they are part is completed. Some of the springs 560 are shown in phantom in FIG. 15 as being circular, other are shown as being hexagonal, and others being square. They may have other polygonal shapes as well, so long as they can be compressed and expand axially.

FIGS. 16, 17 and 18 illustrate the use of magnets, using magnetic attraction as the "adhesive" for holding the recessed part and its flange on which the magnets are mounted to the cover plate being protected.

FIG. 16 shows the intermediate connection flexible multi-fold section 46 which is both a seal and the springs of the intermediate connection. The magnets 660 are shown attached to the flange 52. Magnets 660 may be any of several configurations such as magnets 662 of FIGS. 17 and 664 of FIG. 18. The magnets 662 of FIG. 17 are strip magnet segments of the type commonly used for many years to seal and retain the doors of refrigerators in their closed position, yet permit the door to be opened when sufficient force is exerted to open the door by overcoming the magnetic attraction between the magnets mounted on the door and the refrigerator housing against which the door is closed. While they may sealingly engage the cover plate of the wall-mounted control to be protected when they are in magnetic adhesion engagement with that cover plate, at times they will not completely cover all of the flange surface, leaving some slight spaces between the flange 52 and the surface of the cover plate where the magnetic strips 662 are somewhat shorter than the space they would occupy if the magnetic strips were extending over the entire surface of the flange 52, there is sufficient protection for preventing paint from being on the cover plate and the wall-mounted control during the painting operation.

In similar fashion, the magnets 660 of FIG. 16, instead of being strip magnets 662, may be several typical small disc-shaped magnets 664, as shown in FIG. 18. Such magnets are often used in crafts and are readily available. They are usually discs with a North pole on one side and the South pole on the other side. They are attached, usually being glued, to the flange 52 either independently, or within a magnetic matrix. FIG. 18 shows an array of three such magnets 664. It is preferable to use the magnetic matrix 666, which is typically a plastic, non-magnetic material in which the disc magnets 664 are imbedded, leaving their pole sides uncovered. This makes it easier to handle a group of magnets during assembly of the paint shield and also retains the individual magnets in their desired relative position. For this purpose, the non-magnetic matrix 666 surrounding a plurality of individual disc magnets 664 is advocated for each group of magnets on each side of the flange 52.

In summary as to the manner of installing and removing the paint shields embodying the invention and using the adhesive of FIGS. 1, 2 and 4 (or the magnets of FIGS. 14 through 18 in similar manner), the shield is placed over the wall-mounted cover plate so that the flanges 22, 24, 26 and 28 or their equivalent if not a rectangle but differently formed have their outer edges 34, 36, 38 and 40 touching the wall. The handle or recessed part 56 is then pressed inward until its adhesive-covered surface is pressed against the outer surface of the wall-mounted cover plate, effectively attaching the paint shield and holding it in place during the painting operation. After the wall is painted, the handle may be grasped and pulled in the direction away from the wall. The adhesive is not sufficiently strong to resist this movement, so the flat plate section 52 on which the adhesive is located is detached from the wall-mounted cover plate 12 or its equivalent, and the paint shield is simply removed. If desired, it may be reused several times during the wall painting process, until it becomes either overloaded with paint or the adhesive no longer adheres sufficiently, at which time the paint shield is disposed of appropriately.

What is claimed is:

1. A paint shield for protecting a wall-mounted control and its cover plate during painting of the wall on which the control is mounted, said paint shield being arranged to be placed temporarily over such control, and when so placed, at all such times completely shielding that control, and then removed when the painting of the wall is completed, and only after such removal is completed is said control exposed, said paint shield comprising:
   a plate having an inner side and an outer side and an opening extending therethrough;
   and a recessed member having a connective structure between said recessed member and said plate by which said recessed member is movably and sealingly mounted on said plate;
      said plate and said recessed member and said connective structure being selectively actuated to be operatively temporarily secured to and cover the wall-mounted control and its cover plate with said recessed member having moved relative to said plate as needed to accommodate the wall-mounted control being contained within said recessed member before and while painting the wall on which the control is mounted so as to protect them from being painted, and to be operatively released from and removed from the wall-mounted control and its cover plate.

2. The paint shield of claim 1, said recessed member extending through said plate opening and having a handle section extending outwardly beyond said outer side of said plate and a securing section extending inwardly beyond said inner side of said plate.

3. The paint shield of claim 1, said recessed member further having a chamber formed therein and an open end opening into said chamber, said chamber operatively receiving the portion of the wall-mounted control which extends through its cover plate when that cover plate is covered by said paint shield in preparation for painting the wall.

4. The paint shield of claim 3, said recessed member further having a flange extending outwardly around said open end in a plane substantially parallel to said plate, said flange having an inner side which is substantially parallel to the plane of said plate and further having an adhesive thereon, said adhesive being operable to selectively secure said flange inner side to and to be released from the wall-mounted control cover plate.

5. The paint shield of claim 4, said recessed member being selectively movable relative to said plate and away from or toward the wall-mounted control cover plate, when said paint shield is in place relative to the wall-mounted control cover plate, for a distance sufficient to engage said adhesive with the wall-mounted control cover plate to adhesively secure said recessed member flange to and sealing a portion of the wall-mounted control cover plate and thus temporarily mounting said paint shield in position to protect the wall-mounted control from paint as the wall in the vicinity of the wall-mounted control is being painted;

said recessed member further selectively operable, while being so secured and sealing, to be selectively pulled away from the wall-mounted cover plate by overcoming said adhesive's securing action between said recessed member flange and the wall-mounted control cover plate, releasing said paint shield from the wall-mounted control cover plate when desired.

6. A paint shield for protecting a wall-mounted cover and at least one wall-mounted control normally covered by the cover, the wall-mounted control having a manual control portion extending through and projecting outwardly of the wall-mounted cover, said paint shield comprising:

a first section forming a cover plate configured to peripherally extend over and cover a peripheral part of the wall-mounted cover, said first section having an opening therein defined by an inner peripheral surface on said first section, said opening having a center axis which extends substantially a right angle to said first section;

an intermediate connection;

a second section connected with said first section by said intermediate connection;

said second section extending axially through said first section opening for axial movements relative thereto;

said second section having a closed end and an open end, said ends being axially spaced apart, said second section defining between said ends a space which that operatively receives the manual control of the at least one wall-mounted control extending through said first section opening in coaxial relation to said axis of said first section opening;

a flange formed on said second section open end and extending peripherally outward to provide an outward peripheral flange surface and another flange surface extending between said one open end and said outward peripheral surface, said another flange surface being the side of said flange extending axially away from said second section, said flange being in a plane which is substantially perpendicular to said first section opening axis, said another flange surface having an adhesive thereon which is operable to engage and hold said flange into engagement with the wall-mounted cover when said second section is moved axially further through said first section opening to so operatively engage said flange with said wall-mounted cover;

said intermediate connection having spring arrangement biasing said second section in opposite axial directions and acting on said first and second sections to have an at-rest relative axial position wherein said spring arrangement holds said second section in an axially central at-rest position relative to said first section, said spring means arrangement being able to axially expand and contract to permit said second section to be moved relative to said first section against the spring force of said spring arrangement acting on said second section and tending to return said second section to its central axial position, said spring arrangement operatively allowing said second section adhesively-coated flange to adhesively engage the wall-mounted cover plate upon sufficient axial movement of said second section flange toward the wall-mounted cover plate, and that adhesive engagement then holding said second section in that axial position until being deliberately pulled away from the wall-mounted cover plate for removal of said paint shield from covering engagement with said wall-mounted cover plate.

7. The paint shield of claim 6 wherein said intermediate connection including said spring arrangement have an at-rest length condition wherein said spring arrangement is at a spring-force-balanced condition and said intermediate connection acts as a compression spring when compressed and a tension spring when tensioned, said intermediate connection extending axially about said first section opening center axis and having a first end and a second end, said first end extending from said first section inner peripheral second surface and said second end extending from said second section flange outer peripheral surface so that said intermediate connection is sealingly connected and spring-connected to said first and second sections for exertion of spring forces thereon.

8. The paint shield of claim 7 wherein said intermediate connection spring arrangement is subjected to tension forces exerted by at least a part of said spring arrangement when said first section is moved axially outward of said first section from said spring arrangement's at-rest length condition.

9. The paint shield of claim 7 wherein said intermediate connection spring arrangement is subjected to compressive forces exerted by at least a part of said spring arrangement when said second section is moved axially inward of said first section from said spring arrangement's at-rest length condition.

10. The paint shield of claim 7 wherein said intermediate connection spring arrangement is subjected to tension forces exerted by at least a part of said spring arrangement when said first section is moved axially outward of said first section from said spring arrangement's at-rest length condition, and said intermediate connection spring arrangement is subjected to compressive forces exerted by at least a part of said spring arrangement when said second section is moved axially inward of said first section from said spring arrangement's at-rest length condition.

11. A paint shield for shielding a wall-mounted device and its cover plate installed on a wall while the adjacent parts of the wall are being painted, said paint shield comprising:

a first member selectively being fit over the device to be shielded and also its cover plate;

a second member movably mounted on and in said first member to be movable within said first member on an axis which is perpendicular to said first member;

and a third member connected to both said first and second members acting between said first and second members to seal the space between them during said movements of said second member relative to said first member;

said second member also having a chamber which selectively fit over, receives and protects any part of the device that projects away from the wall and beyond the device's cover plate against paint being applied to the adjacent parts of the wall;

said second member further having thereon elements which are selectively temporarily secured to the device's cover plate when said second member is moved toward engagement with the cover plate, securing said paint shield to the device's cover plate so that it protects the device and its cover plate from paint while the adjacent parts of the wall are being painted; said elements selectively removable from securing engagement with the device's cover plate by moving said second member away from the device's cover plate and the wall, releasing said paint shield so that said paint shield may be removed and reused when desired.

12. The paint shield of claim 11, said elements being a sticky adhesive that is selectively operable to stick to the device's cover plate and to be pulled away therefrom when said second member is pulled away from the device's cover plate and thus release said paint shield from the cover plate.

13. The paint shield of claim 11, said elements being magnets which are adapted to be magnetically attracted by said magnets' magnetic forces to magnetically sensitive parts of the wall-mounted device's cover plate when said second member is moved into operative engagement with the device's cover plate, said magnets' magnetic forces being operable to secure said second member to those magnetically sensitive parts and thus secure said paint shield to the device's cover plate in its paint protection position; said magnets' magnetic forces being overcome to release said second member from the magnetic forces securing said paint shield to the device's cover plate by physically removing said second member from magnetic engagement with the device's cover plate so that said paint shield is removable from the position wherein the device and its cover plate were shielded from paint.

14. The paint shield of claim 11, said third member being an annular accordion-like multi-fold seal connected at one end to said first member and at its other end to said second member, said annular accordion-like multi-fold seal being selectively stretchable with spring-like resistance and selectively compressible by spring-like action so as to sealingly accommodate axial movements of said second member relative to said first member.

15. The paint shield of claim 11, said third member being a labyrinth seal, and said second member having a flange operatively provided on said open end thereof, said flange having a surface which, when being installed, faces toward the device's cover plate when said paint shield is placed thereover, said flange surface having said elements thereon operatively securing said second member to the device's cover plate.

16. The paint shield of claim 15, said elements being a sticky adhesive that is operable to stick to the device's cover plate and to be pulled away therefrom when said second member is pulled away from the device's cover plate and thus release said paint shield from the cover plate.

17. The paint shield of claim 15, said elements being magnets which are adapted to be magnetically attracted by said magnets' magnetic forces to magnetically sensitive parts of the wall-mounted device's cover plate when said second member is moved into operative engagement with the device's cover plate, said magnets' magnetic forces being operable to secure said second member to those magnetically sensitive parts and thus secure said paint shield to the device's cover plate in its paint protection position; said magnets' magnetic forces being selectively overcome to release said second member from the magnetic forces securing said paint shield to the device's cover plate by physically removing said second member from magnetic engagement with the device's cover plate so that said paint shield is removable from the position wherein the device and its cover plate were shielded from paint.

18. The paint shield of claim 17, said magnets being flat strip magnets with their magnetic north poles on one side and their magnetic south poles being on the opposite side, said strip magnets being secured to said flange surface.

19. The paint shield of claim 17, said magnets being flat circular magnets with their magnetic north poles on one side and their magnetic south poles being on the opposite side, said flat circular magnets being mounted in non-magnetic matrices with said magnetic sides being exposed, said matrices being secured to said flange surface so that one side of each of said flat circular magnets can operatively engage the device's cover plate and provide magnetic force tending to secure said second member to the device's cover plate.

* * * * *